United States Patent
Ito et al.

(10) Patent No.: US 11,628,699 B2
(45) Date of Patent: Apr. 18, 2023

(54) SUSPENSION ARM BUSHING

(71) Applicant: HONDA MOTOR CO., LTD., Tokyo (JP)

(72) Inventors: Yuho Ito, Wako (JP); Toshio Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/556,114

(22) Filed: Dec. 20, 2021

(65) Prior Publication Data

US 2022/0194152 A1 Jun. 23, 2022

(30) Foreign Application Priority Data

Dec. 22, 2020 (JP) .............................. JP2020-211913

(51) Int. Cl.
 *B60G 7/00* (2006.01)
(52) U.S. Cl.
 CPC .......... *B60G 7/001* (2013.01); *B60G 2204/41* (2013.01)
(58) Field of Classification Search
 CPC ... B60G 7/001; B60G 2204/41; F16F 1/3835; F16F 1/361
 See application file for complete search history.

(56) References Cited

U.S. PATENT DOCUMENTS

| | | | | |
|---|---|---|---|---|
| 5,814,999 | A * | 9/1998 | Elie | B60G 17/019 324/699 |
| 10,161,467 | B2 * | 12/2018 | Terashima | F16F 1/3615 |
| 10,400,841 | B2 * | 9/2019 | Inoue | F16F 15/03 |
| 10,731,725 | B2 * | 8/2020 | Inoue | F16F 7/1011 |
| 10,844,923 | B2 * | 11/2020 | Inoue | F16F 1/361 |
| 2020/0262260 | A1 * | 8/2020 | Ito | B60G 13/003 |
| 2020/0263751 | A1 * | 8/2020 | Ito | F16F 1/3615 |
| 2020/0263755 | A1 * | 8/2020 | Ito | F16F 13/28 |

FOREIGN PATENT DOCUMENTS

JP 6209497 B2 10/2017

* cited by examiner

*Primary Examiner* — Paul N Dickson
*Assistant Examiner* — Tiffany L Webb
(74) *Attorney, Agent, or Firm* — Rankin, Hill & Clark LLP

(57) ABSTRACT

A suspension arm bushing provided in a vehicle includes coils. First magnetic viscoelastic elastomers are arranged at both ends in an axial direction of a housing, respectively, to sandwich the coils. A second magnetic viscoelastic elastomer is arranged in the housing so as to be sandwiched between the coils. A controller selectively switches directions of magnetic fields generated by the coils between the same direction and opposite directions.

5 Claims, 5 Drawing Sheets

SUSPENSION ARM BUSHING

CROSS-REFERENCE TO RELATED APPLICATION

The present application claims the benefit of priority to Japanese Patent Application No. 2020-211913 filed on Dec. 22, 2020, the disclosures of all of which are hereby incorporated by reference in their entireties.

TECHNICAL FIELD

The present disclosure relates to a suspension arm bushing.

BACKGROUND ART

Suspension arm bushings have been proposed to provide ride comfort, operational stability, and road noise performance of a vehicle. The suspension arm bushings are members to connect suspensions to knuckles, a vehicle body or a subframe, and to transmit vibration input of the suspension to the vehicle body.

The suspension arm bushings are mainly used to regulate displacement of suspension arms such that tires are kept perpendicular to a road surface when the vehicle travels straight or makes a turn. For this purpose, it is desirable for the suspension arm bushings to have high rigidity, so as to be less affected by irregularities of the road surface.

Meanwhile, the suspension arm bushings are also used to block the vibration input so as not to transmit input from the road surface to the vehicle body when the vehicle travels at constant speed on a rough road surface. For this purpose, it is desirable for the suspension arm bushings to have low rigidity, in accordance with the principle of vibration isolation.

Japanese Patent No. 6209497 is cited herein as Patent Document 1.

SUMMARY

The softer springs of the suspension arm bushings are, the more suspension vibration, to be transmitted to the vehicle body, can be blocked, so that interior noise is reduced and ride comfort on a rough road surface is improved (improvement in vibration noise performance).

However, in this case, due to low support rigidity of suspension components, displacement of the suspension components in a main input direction of vibration (axial direction of the suspension arms) is large while the vehicle turning or having disturbance input, to potentially impair ride comfort such as handling performance.

Therefore, it is not possible to achieve both vibration noise performance and ride comfort, which contradict each other, with the same suspension arm bushings.

The aforementioned Patent Document 1 discloses two coils and having different directions either in winding the coils or in flowing a current in the coils, but does not disclose controlling directions of magnetic fields generated by the two coils so as to be in the same direction or different directions.

Therefore, the present disclosure is intended to provide suspension arm bushings allowing for selectively improving vibration noise performance and ride comfort.

A suspension arm bushing provided in a vehicle, includes: a housing which includes an inner cylindrical part having a hollow axial region and made of a magnetic material, and an outer cylindrical part arranged coaxially with the inner cylindrical part on a radially outer side of the inner cylindrical part and made of a magnetic material; a magnetic viscoelastic elastomer arranged in the housing; and coils arranged in the housing and applying magnetic fields to change viscoelasticity of the magnetic viscoelastic elastomer, wherein the coils include at least two coils, the magnetic viscoelastic elastomer includes first magnetic viscoelastic elastomers arranged at both ends in an axial direction of the housing, respectively, so as to entirely sandwich the coils, and a controller is provided to selectively switch directions of the magnetic fields generated by the coils between the same direction and opposite directions.

According to the present disclosure, suspension arm bushings are provided to allow for selectively improving vibration noise performance and ride comfort.

DETAILED DESCRIPTION

An embodiment of the present disclosure is described below with reference to the drawings.

Figure 1:
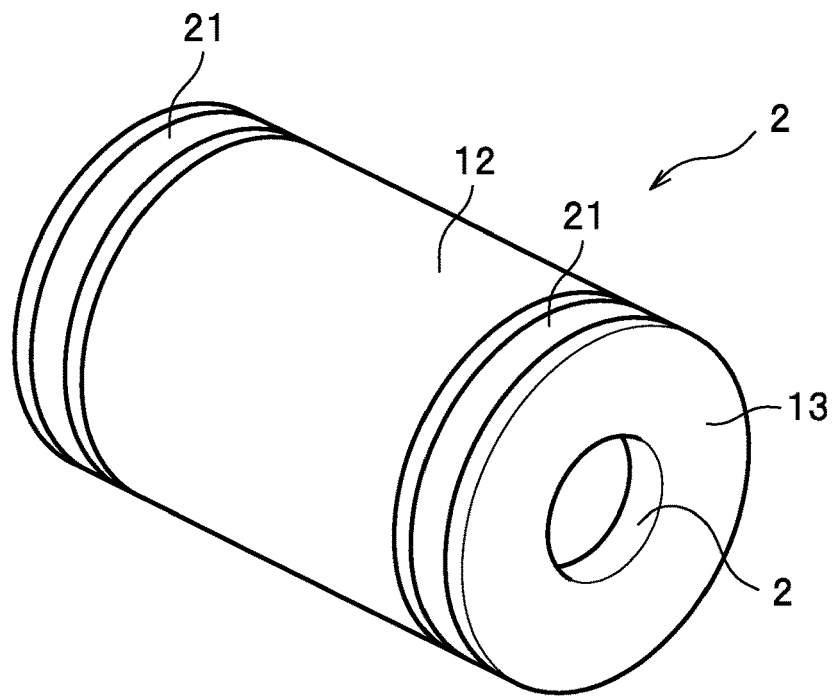
FIG. 1 is a perspective view of a body of a suspension arm bushing as an embodiment of the present disclosure.
Figure 2:
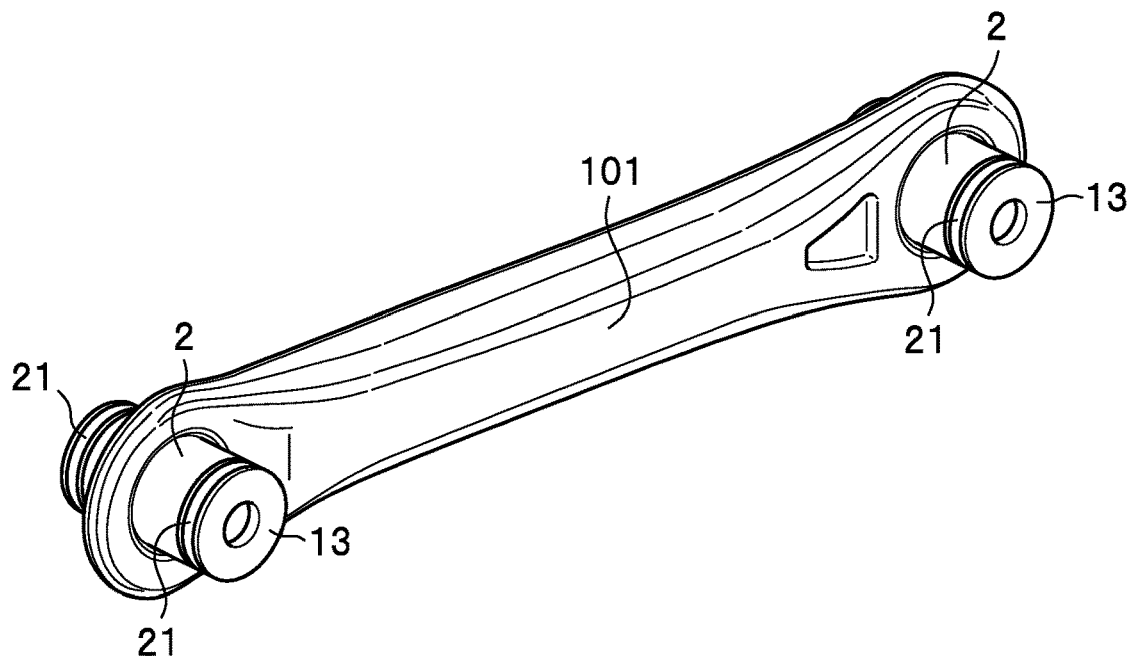
FIG. 2 is a perspective view of a suspension arm with the bodies of the suspension arm bushings, as the embodiment of the present disclosure, attached to both ends thereof.

FIG. 1 is a perspective view of a body of a suspension arm bushing as an embodiment of the present disclosure. FIG. 2 is a perspective view of a suspension arm with the bodies of the suspension arm bushings attached to both ends thereof. Bodies 2 of suspension arm bushings 1 (FIG. 3) are attached to both ends of a suspension arm 101 and fixed to a vehicle body, a subframe, or a knuckle. A body 2 is a cylindrical member.

Figure 3:
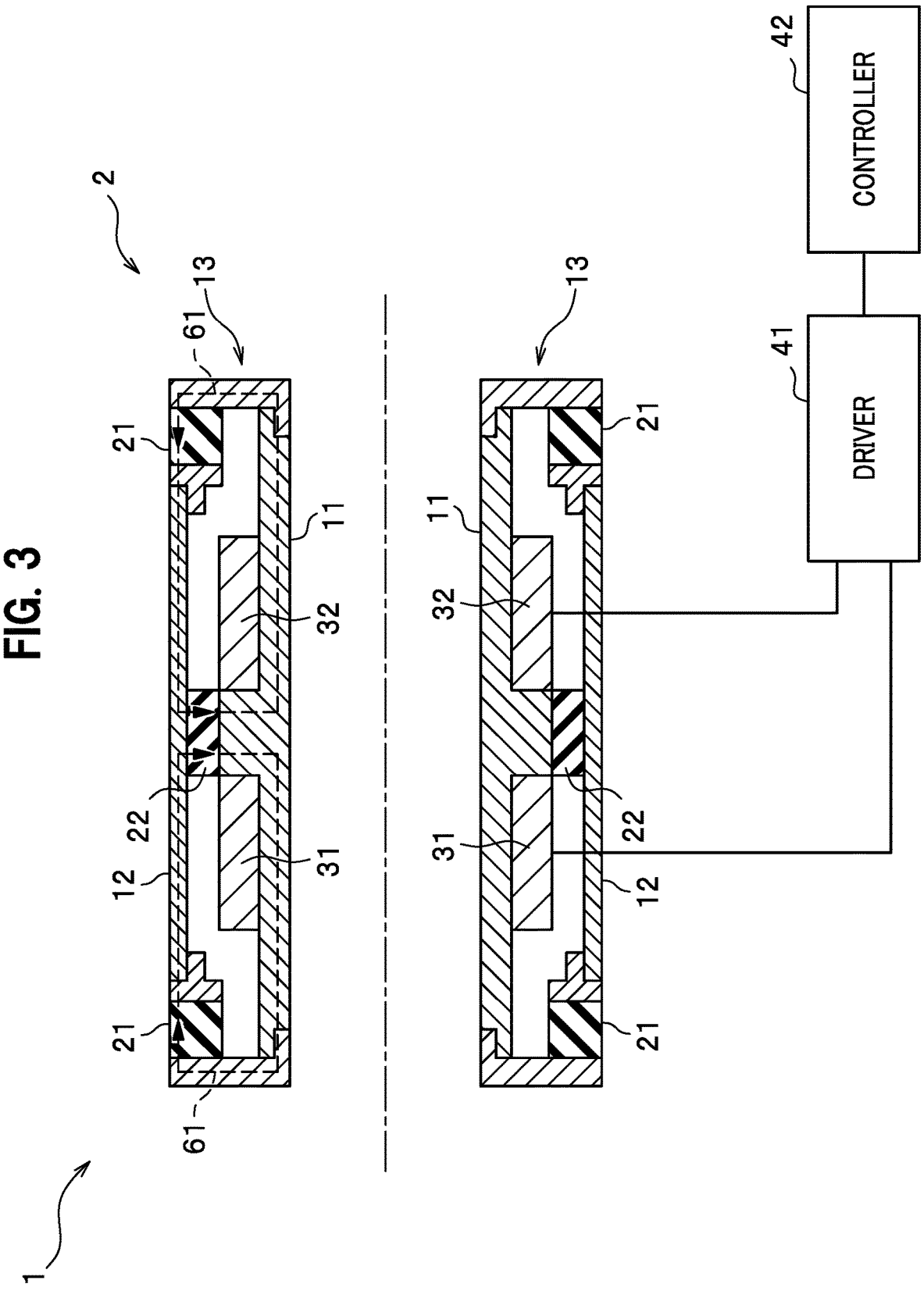
FIG. 3 is a cross-sectional view of the body of the suspension arm bushing as the embodiment of the present disclosure.
Figure 4:
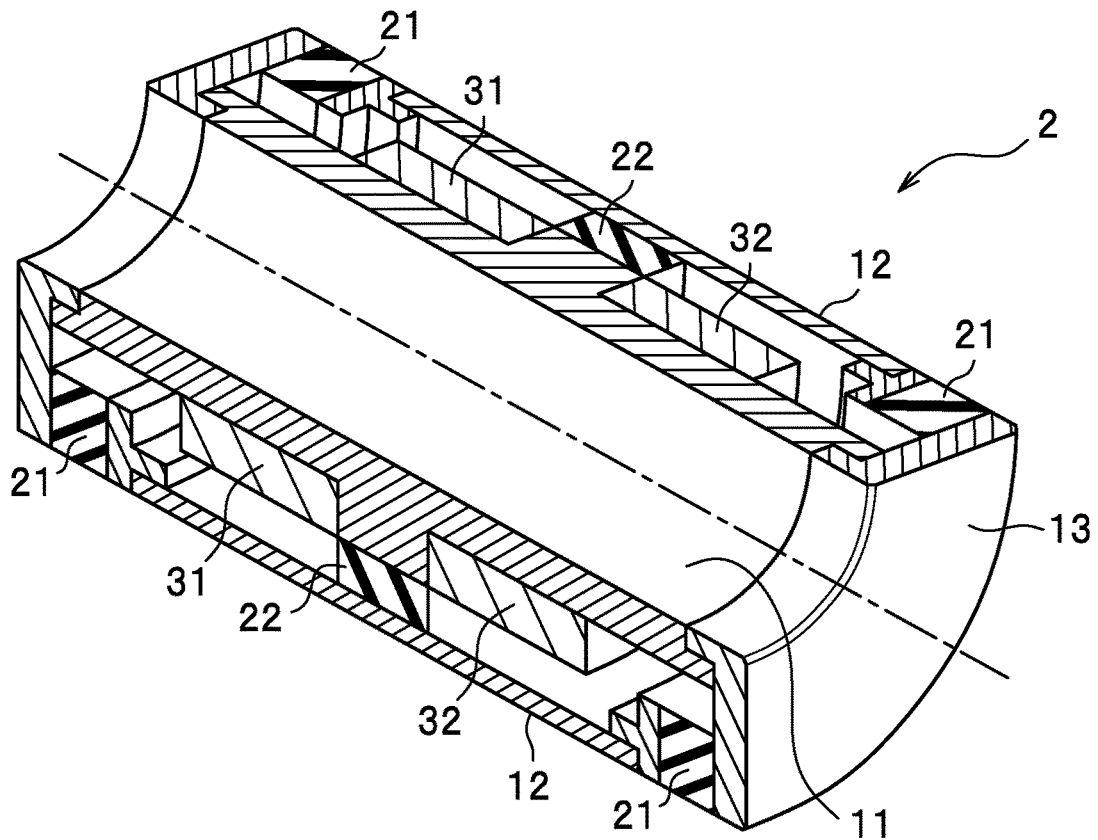
FIG. 4 is a perspective view of the suspension arm bushing, as the embodiment of the present disclosure, partially cut.

FIG. 3 is a cross-sectional view of the body of the suspension arm bushing. FIG. 4 is a perspective view of the suspension arm bushing partially cut.

As illustrated in FIGS. 3 and 4, the body 2 of the suspension arm bushing 1 has a cylindrical hollow housing 13 which includes an inner cylindrical part 11 having a hollow axial region and made of a magnetic material, and an outer cylindrical part 12 arranged coaxially with the inner cylindrical part 11 on a radially outer side of the inner cylindrical part 11 and made of a magnetic material. Note that a dashed straight line in FIG. 3 indicates a central axis of the hollow axial region of the body 2 (housing 13).

The body 2 is provided with first magnetic viscoelastic elastomers 21 and a second magnetic viscoelastic elastomer 22, which are both in an annular shape about the central axis indicated by the straight dashed line in FIG. 3, so as to be sandwiched between the inner cylindrical part 11 and the outer cylindrical part 12 in the housing 13.

At least two coils 31, 32, in an annular shape about the central axis indicated by the straight dashed line in FIG. 3, are arranged on the inner cylindrical part 11 in the housing 13. The coils 31, 32 apply magnetic fields to change viscoelasticity of the first magnetic viscoelastic elastomers 21 and second magnetic viscoelastic elastomer 22.

The first magnetic viscoelastic elastomers 21 are arranged on both sides in an axial direction of the housing 13 to sandwich the coils 31, 32, respectively. Incidentally, in the present embodiment, the first magnetic viscoelastic elastomers 21 are exposed to an outside of the body 2.

The second magnetic viscoelastic elastomer 22 is arranged in the housing 13 so as to be sandwiched between the coil 31 and coil 32.

The coil 31 and coil 32 are connected with a driver 41 to apply a current to the coil 31 and coil 32 selectively in the same direction or opposite directions. This causes the coil 31 and coil 32 to generate magnetic fields selectively in the same direction or opposite directions. The driver 41 is connected with a controller 42 including a microcomputer, and the controller 42 controls the driver 41 to apply a current to the coil 31 and coil 32 selectively in the same direction or opposite directions.

Figure 5:
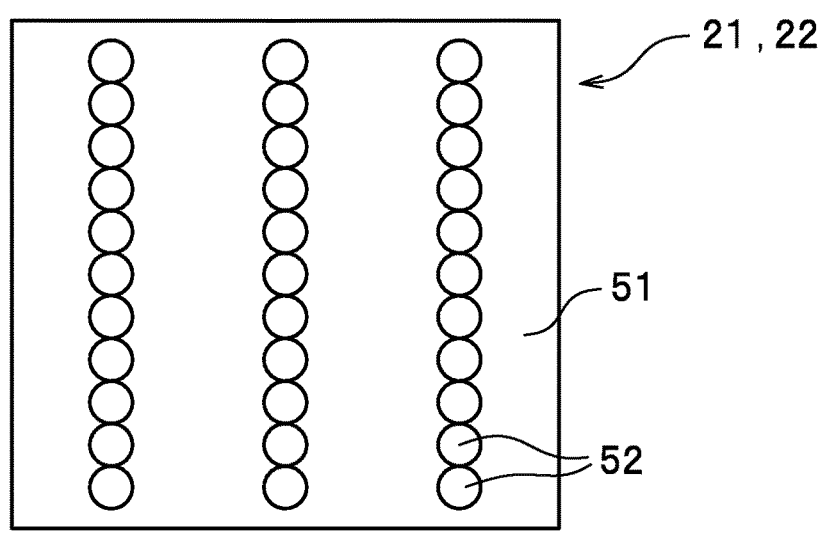
FIG. 5 is a cross-sectional view of each of a first and second magnetic viscoelastic elastomers of the suspension arm bushing as the embodiment of the present disclosure.

FIG. 5 is a cross-sectional view of each of the first magnetic viscoelastic elastomer 21 and second magnetic viscoelastic elastomer 22. The first and second magnetic viscoelastic elastomers 21, 22 each include a large number of magnetic particles 52 in a rubber material 51.

The magnetic particles 52 of the first magnetic viscoelastic elastomer 21 are arranged parallel to the axial direction of the housing 13. The magnetic particles 52 of the second magnetic viscoelastic elastomer 22 are arranged orthogonal to the axial direction of the housing 13.

Next, advantageous effects of the suspension arm bushings 1 are described.

The softer springs of the suspension arm bushings are, the more suspension vibration, to be transmitted to the vehicle body, can be blocked, so that interior noise is reduced and ride comfort on a rough road surface is improved (improvement in vibration noise performance).

However, in this case, due to low support rigidity of suspension components, displacement of the suspension components in a main input direction of vibration (axial direction of the suspension arm) is large while the vehicle turning or having disturbance input, to potentially impair ride comfort such as handling performance.

Then, the suspension arm bushings 1 can selectively improve vibration noise performance and ride comfort as follows.

Figure 6:
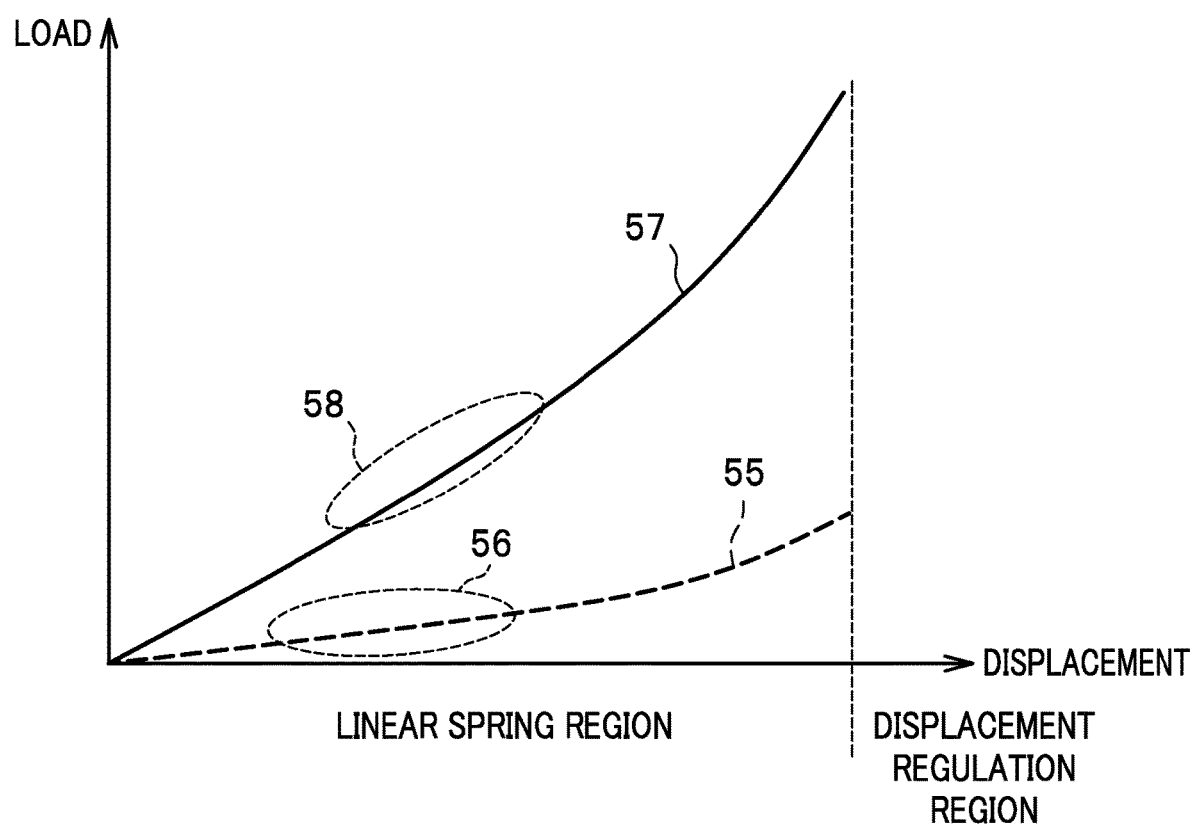
FIG. 6 is a chart showing a relationship between a load applied to the suspension arm bushing and displacement.

FIG. 6 is a chart showing a relationship between a load applied to the suspension arm bushings and displacement. The suspension arm bushing is used in a linear spring region thereof, but not used in a displacement regulation region thereof. When radial rigidity of the suspension arm bushings is relatively low, a graph 55 is obtained, and a region 56 is used to improve vibration noise performance. Further, when radial rigidity of the suspension arm bushings is relatively high, a graph 57 is obtained, and a region 58 is used to improve ride comfort.

Then, when it is desired to improve the vibration noise performance with the suspension arm bushings 1, a current is applied in opposite directions to the coil 31 and coil 32, to cause the coil 31 and coil 32 to generate magnetic fields in opposite directions with each other. The directions of the magnetic fields in this case are indicated by arrows 61 in FIG. 3. The two first magnetic viscoelastic elastomers 21 are applied with magnetic fields in the opposite directions, respectively. The magnetic fields are both oriented in the axial direction of the housing 13. The first magnetic viscoelastic elastomer 21 is affected by the magnetic fields because of having the magnetic particles 52 arranged parallel to the axial direction of the housing 13, to have increased rigidity. However, the coil 31 and coil 32 generate magnetic fields in opposite directions, so that the magnetic field applied to the first magnetic viscoelastic elastomers 21 is weak (the magnetic fields of the coil 31 and coil 32 do not exert synergistic effects with each other), to cause the first magnetic viscoelastic elastomers 21 to have relatively small rigidity. As a result, rigidity of the suspension arm bushings 1 in the radial direction is relatively increased. This improves the vibration noise performance of the vehicle.

In this case, as indicated by the arrows 61 in FIG. 3, the second magnetic viscoelastic elastomer 22 is also applied with the magnetic fields in the radial direction of the suspension arm bushing 1 from the coil 31 and coil 32. The magnetic particles 52 of the second magnetic viscoelastic elastomer 22 are arranged orthogonal to the axial direction of the housing 13. Therefore, the second magnetic viscoelastic elastomer 22 increases axial rigidity of the suspension arm bushing 1. This also improves the vibration noise performance of the vehicle.

Figure 7:
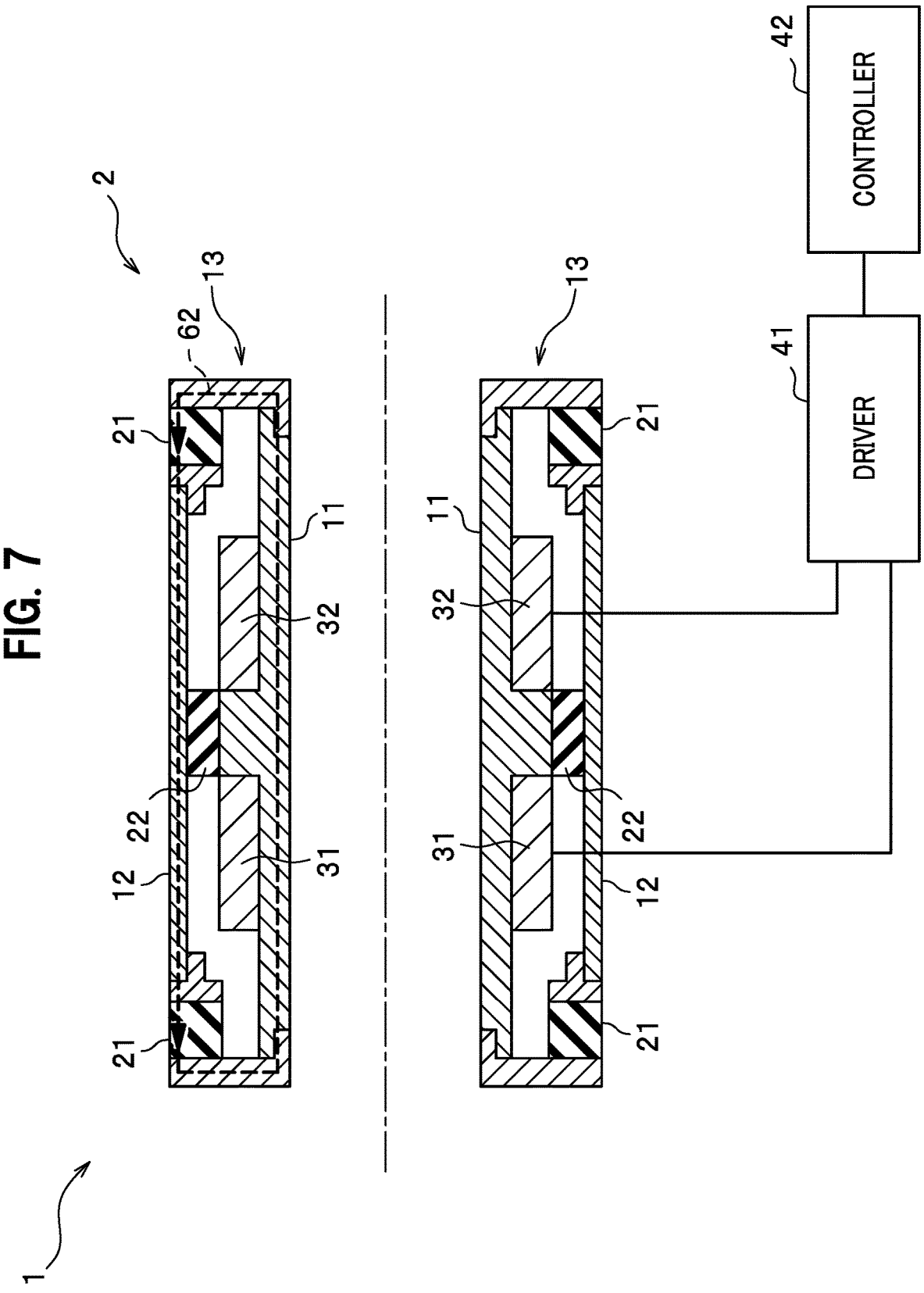
FIG. 7 is a cross-sectional view of the body of the suspension arm bushing as the embodiment of the present disclosure.

FIG. 7 is a cross-sectional view of the body 2 of the suspension arm bushing 1.

In the suspension arm bushing 1 in this case, a current is applied to the coil 31 and coil 32 in the same direction to cause the coil 31 and coil 32 to generate magnetic fields in the same direction. The direction of the magnetic fields in this case is indicated by an arrow 62 in FIG. 7. In this case, strong magnetic fields are applied to the first magnetic viscoelastic elastomers 21 due to synergistic effects of the magnetic field of the coil 31 and the magnetic field of the coil 32. The magnetic fields are oriented in the axial direction of the housing 13. The first magnetic viscoelastic elastomer 21 is affected by the magnetic fields because of having the magnetic particles 52 arranged parallel to the axial direction of the housing 13, to have greatly increased rigidity in the radial direction of the suspension arm bushing 1. This improves ride comfort of the vehicle.

Note that selection of the directions of the current to be supplied to the coil 31 and coil 32 is determined by the controller 42 based on vehicle speed, lateral G, a steering angle, engine speed, an accelerator position, and the like. This improves comfort when the vehicle cruises on an expressway, and steering performance when the vehicle travels on a winding road, for example.

Further, a mode switch or the like may be provided to allow a user to switch between comfort and operational stability.

An automated vehicle may improve traveling performance by putting priority to comfort under normal conditions, and increasing responsiveness in emergency situations such as for avoiding danger.

What is claimed is:
1. A suspension arm bushing provided in a vehicle, comprising:
 a housing which includes an inner cylindrical part having a hollow axial region and made of a magnetic material, and an outer cylindrical part arranged coaxially with the inner cylindrical part on a radially outer side of the inner cylindrical part and made of a magnetic material;

a magnetic viscoelastic elastomer arranged in the housing; and
coils arranged in the housing and applying magnetic fields to change viscoelasticity of the magnetic viscoelastic elastomer, wherein
the coils include at least two coils,
the magnetic viscoelastic elastomer includes first magnetic viscoelastic elastomers arranged at both ends in an axial direction of the housing, respectively, so as to entirely sandwich the coils, and
a controller is provided to selectively switch directions of the magnetic fields generated by the coils between a same direction and opposite directions through the first magnetic viscoelastic elastomers.

2. The suspension arm bushing as claimed in claim 1, wherein the magnetic viscoelastic elastomer further includes a second magnetic viscoelastic elastomer arranged in the housing so as to be sandwiched between the coils.

3. The suspension arm bushing as claimed in claim 2, wherein magnetic particles of the second magnetic viscoelastic elastomer are arranged orthogonal to the axial direction of the housing.

4. The suspension arm bushing as claimed in claim 1, wherein magnetic particles of the first magnetic viscoelastic elastomer are arranged parallel to the axial direction of the housing.

5. The suspension arm bushing as claimed in claim 1 arranged in a suspension arm.

\* \* \* \* \*